(12) United States Patent
Ko

(10) Patent No.: US 11,698,481 B2
(45) Date of Patent: Jul. 11, 2023

(54) TRACEABLE FIBER USING FERRULE AND CAP AT FAN-OUT KIT

(71) Applicant: Eminent Technologies Company, LLC, San Jose, CA (US)

(72) Inventor: Jamyuen Ko, San Jose, CA (US)

(73) Assignee: Eminent Technologies Company, LLC, San Jose, CA (US)

( * ) Notice: Subject to any disclaimer, the term of this patent is extended or adjusted under 35 U.S.C. 154(b) by 0 days.

(21) Appl. No.: 17/400,455

(22) Filed: Aug. 12, 2021

(65) Prior Publication Data

US 2022/0128753 A1 Apr. 28, 2022

Related U.S. Application Data

(63) Continuation-in-part of application No. 17/203,820, filed on Mar. 17, 2021, now Pat. No. 11,333,815, which is a continuation-in-part of application No. 17/079,560, filed on Oct. 26, 2020, now Pat. No. 11,327,253.

(51) Int. Cl.
*G02B 6/44* (2006.01)
*F21V 8/00* (2006.01)
*H01B 1/02* (2006.01)
*H01B 11/00* (2006.01)

(52) U.S. Cl.
CPC .......... *G02B 6/0008* (2013.01); *G02B 6/447* (2013.01); *H01B 1/02* (2013.01); *H01B 11/00* (2013.01)

(58) Field of Classification Search
CPC ...................................................... G02B 6/447
See application file for complete search history.

(56) References Cited

U.S. PATENT DOCUMENTS

| | | | | |
|---|---|---|---|---|
| 5,429,635 A * | 7/1995 | Purcell, Jr. | ............. | A61N 5/062 606/1 |
| 6,906,505 B2 * | 6/2005 | Brunet | ................... | G02B 6/447 324/542 |
| 7,386,203 B2 * | 6/2008 | Maitland | ................ | G02B 6/262 385/27 |
| 8,314,603 B2 * | 11/2012 | Russell | ................ | G02B 6/3895 439/502 |
| 8,909,013 B1 * | 12/2014 | Jiang | ...................... | H04B 10/07 385/115 |
| 10,539,758 B2 * | 1/2020 | Butler | ................ | G02B 6/38875 |
| 10,705,307 B2 * | 7/2020 | Takeuchi | ............. | G02B 6/4452 |
| 11,327,253 B1 * | 5/2022 | Ko | ......................... | G02B 6/3817 |

(Continued)

*Primary Examiner* — Rhonda S Peace
(74) *Attorney, Agent, or Firm* — Christopher P. Maiorana, PC

(57) ABSTRACT

An apparatus including a first ferrule, a second ferrule and a tracing fiber. The first ferrule may comprise a cap. The second ferrule may comprise the cap. The tracing fiber may be configured to propagate light from the first ferrule to the second ferrule. The first ferrule may enable the light to be directed into the tracing fiber when the cap is removed. The cap of the second ferrule may be configured to scatter the light to provide an omnidirectional emission of the light from the second ferrule. The tracing fiber may be bundled with one or more data carrying lines in a cable. Each of the data carrying lines may be configured to enable a communication of data. The tracing fiber may be configured to propagate the light without interrupting the communication of data.

20 Claims, 9 Drawing Sheets

(56) References Cited

U.S. PATENT DOCUMENTS

| | | | |
|---|---|---|---|
| 11,333,815 B1* | 5/2022 | Ko | G02B 6/4204 |
| 2017/0123167 A1* | 5/2017 | Isenhour | G02B 6/0008 |
| 2017/0293102 A1* | 10/2017 | Bauco | G02B 6/3895 |
| 2018/0172925 A1* | 6/2018 | Bauco | G02B 6/447 |
| 2022/0003947 A1* | 1/2022 | Hynes | G02B 6/3895 |
| 2022/0128753 A1* | 4/2022 | Ko | G02B 6/0008 |

* cited by examiner

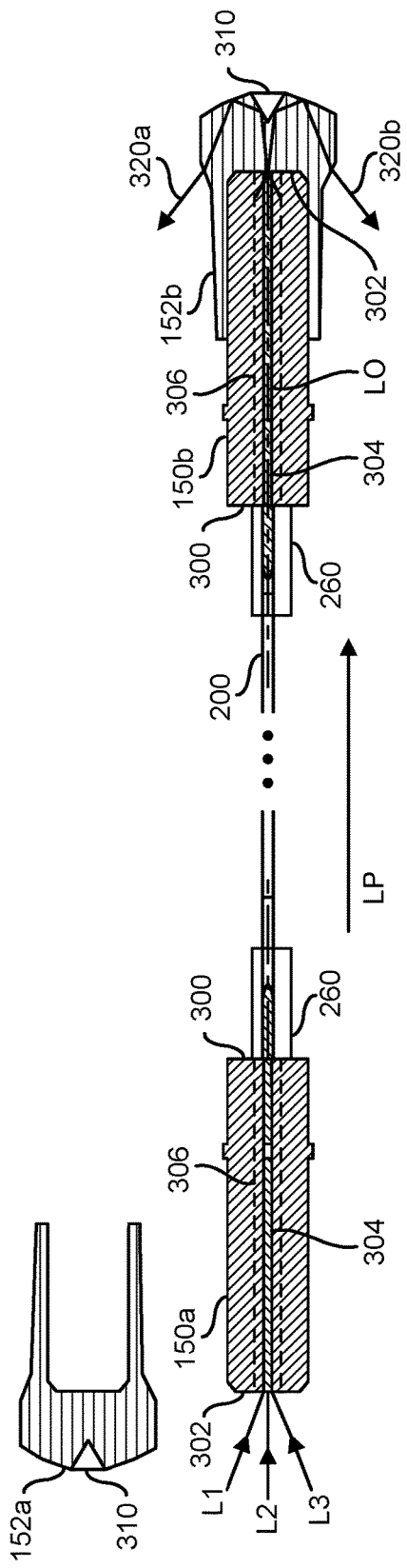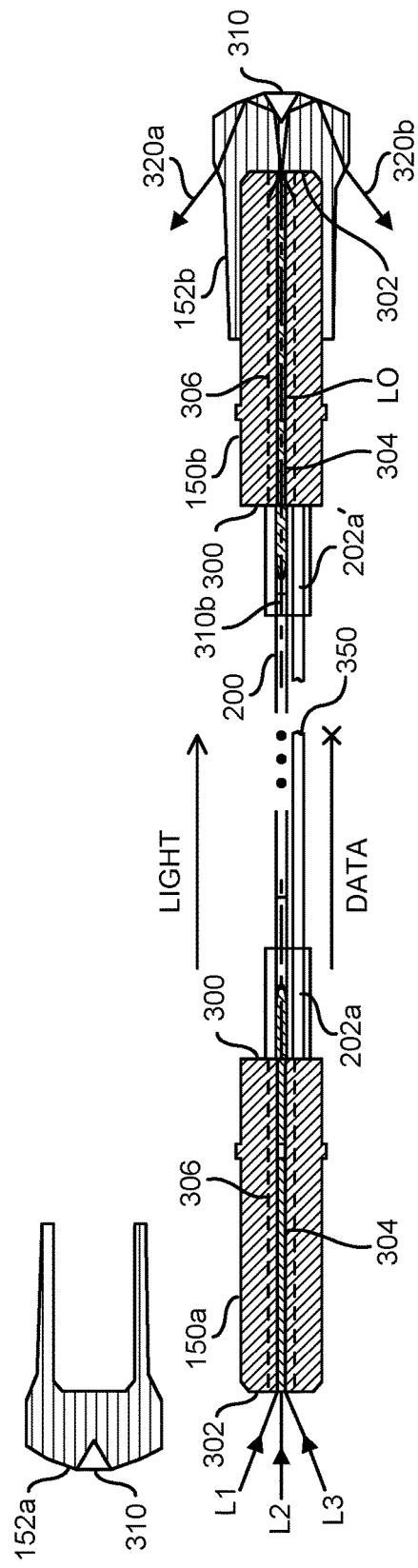

TRACEABLE FIBER USING FERRULE AND CAP AT FAN-OUT KIT

This application relates to U.S. application Ser. No. 17/203,820, filed on Mar. 17, 2021, which relates to U.S. application Ser. No. 17/079,560, filed on Oct. 26, 2020. Each of the mentioned applications are hereby incorporated by reference in its entirety.

FIELD OF THE INVENTION

The invention relates to cable management generally and, more particularly, to a method and/or apparatus for implementing a traceable fiber using ferrule and cap at fan-out kit.

BACKGROUND

Data centers contain complex infrastructure and interconnections. There can be enormously long optical cables connecting server blades and switches. Furthermore, there can be an incredible number of long cables routed throughout the data center. Cable management in a data center can be complicated, even when cables are neatly arranged.

Failure ports indicated in a system control station of a data center can indicate that an interconnection has failed. A field technician has to go on-site to locate one of the failure ports and then search for the other end along the engaged cable. The task of tracing a cable from a failure port to the other end might seem easy but is actually time consuming. Because of the number of cables connected to a cabinet of server blades or across cabinets in a data center, tracing cables can be troublesome and tedious. The cables may cross, tangle, and twist between each other making the tracing effort slow. In many scenarios, data cables need to be unplugged to perform tracing. Unplugging data cables may interrupt data communication in the data center.

It would be desirable to implement a traceable fiber using ferrule and cap at fan-out kit.

SUMMARY

The invention concerns an apparatus including a first ferrule, a second ferrule and a tracing fiber. The first ferrule may comprise a cap. The second ferrule may comprise the cap. The tracing fiber may be configured to propagate light from the first ferrule to the second ferrule. The first ferrule may enable the light to be directed into the tracing fiber when the cap is removed. The cap of the second ferrule may be configured to scatter the light to provide an omnidirectional emission of the light from the second ferrule. The tracing fiber may be bundled with one or more data carrying lines in a cable. Each of the data carrying lines may be configured to enable a communication of data. The tracing fiber may be configured to propagate the light without interrupting the communication of data.

BRIEF DESCRIPTION OF THE FIGURES

Embodiments of the invention will be apparent from the following detailed description and the appended claims and drawings.

FIG. 6 is a diagram illustrating light input to a tracing fiber using a ferrule and light refracted by a cap at an output of a tracing fiber.

FIG. 7 is a diagram illustrating light transmission through a ferrule when a data transmission failure is present.

DETAILED DESCRIPTION OF THE EMBODIMENTS

Figure 1:
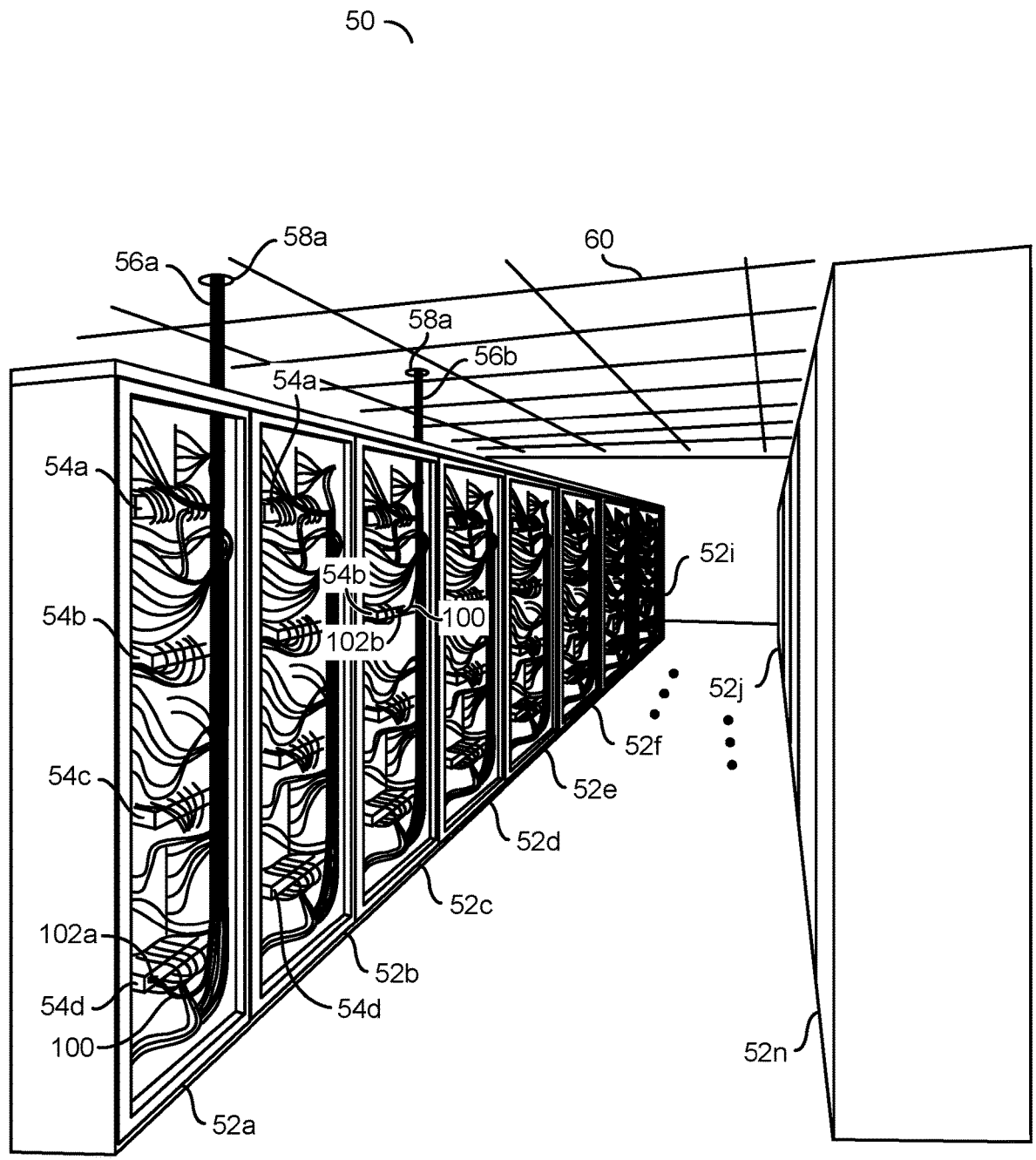
FIG. 1 is a diagram illustrating a context of an embodiment of the present invention.

Embodiments of the present invention include providing a traceable fiber using ferrule and cap at fan-out kit that may (i) facilitate tracing a fiber, (ii) provide a protrusion from a fan-out kit, (iii) provide a traceable fiber separated from data fibers, (iv) be implemented in a data center, (v) refract light using a removable cap to emit light omnidirectionally, (vi) fit into a fault locator, (vii) implement strain relief features, (viii) enable tracing of a cable to be performed without interrupting data communication of the cable (ix) enable a tracing fiber to be glued into a ferrule and/or (x) be implemented in passive or active cables.

Embodiments of the present invention may be configured to enable and/or facilitate tracing a cable. A fan-out kit assembly may be implemented for a cable. The fan-out kit assembly may comprise a fiber-connected ferrule. A ferrule with a removable cap may be added to the fan-out kit along with the data connectors. In an example, the fan-out kit may implement a 1-to-2 fan-out LC cable assembly. The ferrule may comprise a smooth ceramic material in a cylindrical shape. The cap may be removably attached to the ferrule to enable light refraction to spread light emitted out of the ferrule omnidirectionally.

One ferrule and cap may be implemented at each end of the cable. In an example, one end of a cable may have one fan-out kit and another end of the cable may have another fan-out kit. Each fan-out kit may implement the ferrule with the cap. The cap may be removed from one ferrule so that light may be provided as an input to an optical fiber glued into a ferrule at one end of the cable and be emitted by the same optical fiber glued into a ferrule at the other end of the cable that has the cap attached to provide the refraction to spread the light output. Emitting the light may facilitate tracing the cable.

The ferrules may be connected by the optical fiber. For example, the optical fiber (e.g., a tracing fiber) may run through a cable jacket and connect at the fan-out kit assembly at both ends of a fiber optics cable assembly. The tracing fiber may be implemented as a plastic or glass fiber. The tracing fiber may be an additional fiber implemented inside the raw cable in addition to the data fibers. The fan-out kits at each end of the cable may be configured to separate the tracing fiber from the data fibers. The tracing fiber may be an additional fiber that runs parallel to the data communication fibers within the raw cable jacket.

The tracing fiber may be bundled with data fibers. The tracing fiber may be a separate fiber from the data fibers. The tracing fiber may be configured to propagate light without interrupting the communication of data by the data fibers. For example, the data fibers may not need to be unplugged to trace a cable using the ferrules and the tracing fiber.

In an example, data connectors of one end of a cable may be connected to an input/output port (e.g., a communication port) of a telecommunications device and data connectors at another end of the cable may be connected to an input/output port of a second telecommunications device. A technician may shine a light into a ferrule (e.g., with the respective cap removed to enable light to reach the tracing fiber) at one end of the cable. The technician may trace the other end of the cable in response to the light enabled to be emitted by another ferrule (e.g., with the respective cap attached to provide refraction for the light emitted by the tracing fiber) implemented at the end of the cable in response to the light input. The light emitted by the other ferrule may provide an indication of the location other end of the cable.

Referring to FIG. 1, a diagram illustrating a context of an example embodiment of the present invention is shown. An example location 50 is shown. The location 50 may be a representative example of a data center. The data center 50 may be a facility that houses telecommunications hardware. The data center 50 may be used by a small business, a large business, an internet service provider, a cloud storage and/or cloud processing service, a hosting company, a peering exchange, etc. The type of data center 50 may be varied according to the design criteria of a particular implementation.

The data center 50 shown may comprise a number of server cabinets 52a-52n. The server cabinets 52a-52n may comprise various communications and/or computing hardware. In the example shown, one aisle of server cabinets 52a-52n is shown. The data center 50 may comprise multiple aisles of server cabinets 52a-52n. The data center 50 may comprise hundreds of square feet of various hardware for telecommunications.

The server cabinet 52a is shown comprising telecommunications hardware 54a-54d and a number of cables. The server cabinet 52a may be a representative example of any of the server cabinets 52a-52n. For example, each of the server cabinets 52a-52n may comprise the telecommunications hardware 54a-54d and/or a number of cables. The cables may provide data interconnections between the telecommunications hardware 54a-54d. The cables may provide interconnections between the telecommunications hardware 54a-54d within a single one of the server cabinets 52a-52n and/or interconnections between the telecommunications hardware 54a-54d in multiple different server cabinets 52a-52n. The telecommunications hardware 54a-54d may implement routers, switches, rack servers, server blades, etc. The type of telecommunications hardware 54a-54d installed in the server cabinets 52a-52n may be varied according to the design criteria of a particular implementation.

The cables within the server cabinets 52a-52n are represented as a random arrangement of lines. In some examples, the cables in the data center 50 may be neatly organized (e.g., managed cables). In other examples, the cables in the data center may be unmanaged (e.g., a rat's nest of cabling). While unmanaged cabling creates difficulties in tracing cables for a technician, the number and lengths of the cables in the data center 50 may create difficulties for technicians even in a well managed cable scenario.

An apparatus 100 is shown within the server cabinet 52a. The apparatus 100 may implement a cable. The apparatus 100 may be one of the many cables within the server cabinet 52a. In the example shown, one implementation of the apparatus 100 is illustrated. However, one or more of the cables within the data center 50 may be an implementation of the apparatus 100. The apparatus 100 may comprise ferrules with removably attached caps and a tracing fiber to facilitate cable tracing.

One end 102a of the apparatus 100 is shown. The end 102a of the apparatus 100 may be connected to the telecommunications hardware module 54d in the server cabinet 52a. The apparatus 100 may connect the telecommunications hardware module 54d and other telecommunications hardware. For example, the apparatus 100 may enable data transmission between the telecommunications hardware module 54d and another one of the telecommunications hardware modules 54a-54d within one of the server cabinets 52a-52n.

A bundle of cables 56a is shown. The cable bundle 56a is shown partially within the sever cabinet 52a. The cable bundle 56a is shown routed from within the server cabinet 52a and out the top of the server cabinet 52a. The apparatus 100 may be one of the cables of the cable bundle 56a.

The cable bundle 56a is shown routed up into an opening 58a. The opening 58a may be an opening in a ceiling 60 of the data center 50. An opening 58b is shown in the ceiling 60. A bundle of cables 56b is shown dropping cables down from the opening 58b. The bundle of cables 56b may be similar to the cable bundle 56a. The cable bundles 56a-56b may each comprise a different group of cables. While the cable bundles 56a-56b may be described as routing cables up or down, the direction of the cables in each cable bundle 56a-56b may be irrelevant and/or described for illustrative purposes (e.g., data communication may be bi-directional). In an example, the cable bundles 56a-56b may be a form of cable management for routing multiple cables from one location to other locations within the data center 50.

The cable bundle 56b may comprise the apparatus 100. The cable bundle 56b may be partially within the server cabinet 52c. For example, the cable bundle 56b may be routed between the server cabinet 52c and the opening 58b into the ceiling 60. In the example shown, the apparatus 100 may be routed along with the cable bundle 56a out of the server cabinet 52a. Within the ceiling 60, the various cables may be routed towards various directions (not shown). The apparatus 100 may be dropped down from the ceiling 60 as part of the cable bundle 56b and into the server cabinet 52c.

One end 102b of the apparatus 100 is shown. The end 102b of the apparatus 100 may be connected to the telecommunications hardware module 54b in the server cabinet 52c. In the example shown, the apparatus 100 may connect the telecommunications hardware 54d in the server cabinet 52a at the end 102a to the telecommunications hardware 54b in the server cabinet 52c.

The apparatus 100 (and other cables in the data center 50) may be various lengths. In an example, if the apparatus 100 is relatively short (e.g., less than 10 m) a single technician may be capable of tracing the apparatus 100 within the data center 50. However, the apparatus 100 may be longer than 10 m (e.g., hundreds of meters long). The apparatus 100 may be within the cable bundles 56a-56b with multiple other cables. Furthermore, the cable bundles 56a-56b with the apparatus 100 may be routed through inaccessible locations (e.g., in the ceiling 60). For example, the apparatus 100 may be long enough that more than one technician may be needed to trace the apparatus 100. In another example, the apparatus 100 may be traced using a single technician, but the apparatus 100 may be routed through a location (e.g., the ceiling 60) that is out of view of the technician.

The apparatus 100 and/or other cables in the data center 50 may be configured to communicate data. The data communication may fail. In one example, the cables may be pinched and/or physically cut. In another example, hardware may fail and/or not operate up to specifications. In yet another example, the hardware modules 54a-54d may need to be replaced and the cables may need to be reconnected to replacement hardware. Tracing the apparatus 100 and/or other cables may be a common activity of technicians in the data center 50. Tracing may be further used during initial cable installation. Tracing may be further used to determine and/or confirm a configuration of the connections of the apparatus 100, while data is being communicated. The apparatus 100 may be configured to transmit light to facilitate the tracing of the apparatus 100 in the data center 50. The light transmitted within the apparatus 100 may enable the apparatus 100 to be distinguished from other of the cables in the data center 50 (e.g., distinguish the apparatus 100 from other cables in the cable bundle 56a and/or the cable bundle 56b).

Figure 2:
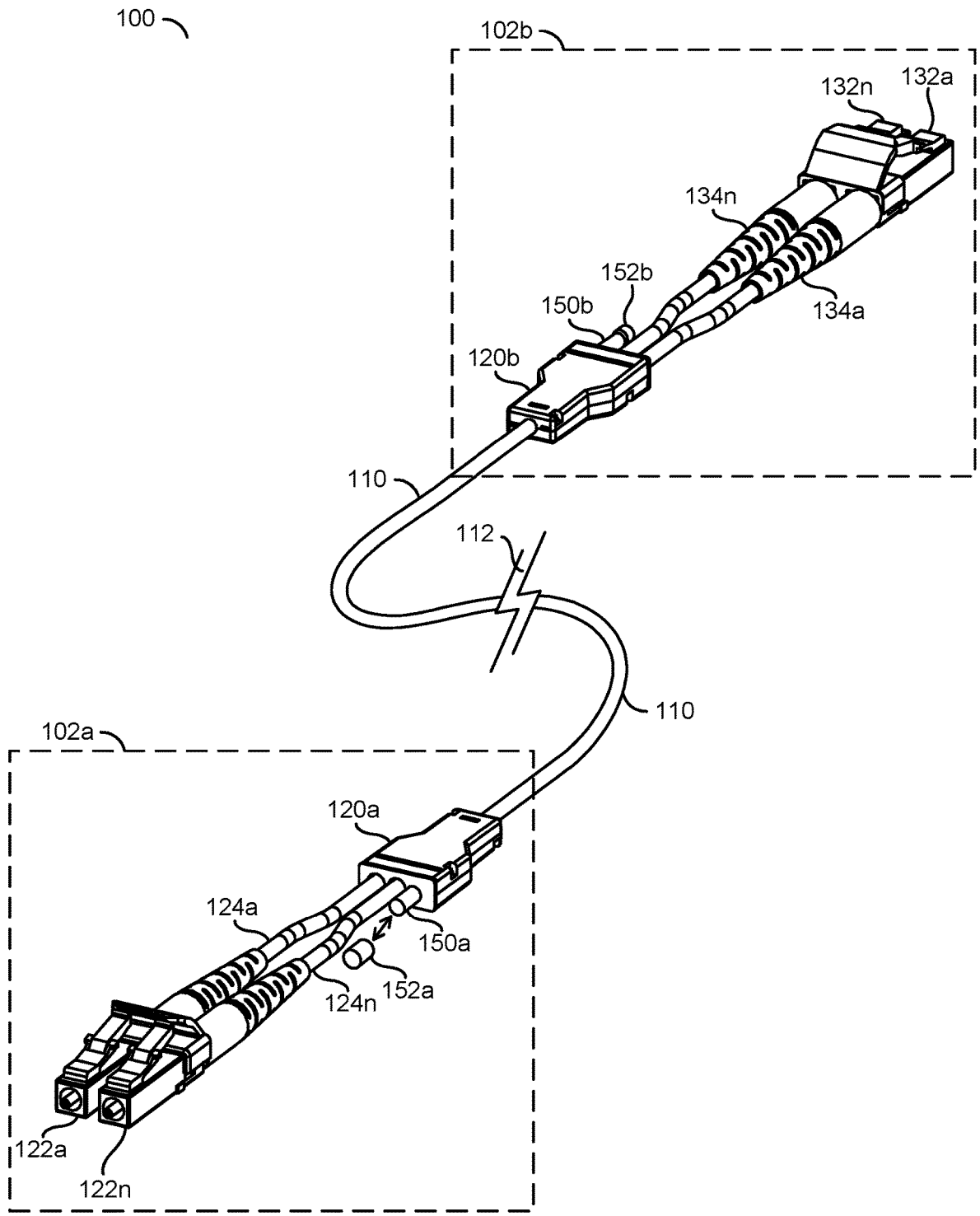
FIG. 2 is a diagram illustrating an example embodiment of the present invention.

Referring to FIG. 2, a diagram illustrating an example embodiment of the present invention is shown. The apparatus 100 is shown. The apparatus 100 may implement a cable. The apparatus 100 may comprise the end 102a and the end 102b as shown in association with FIG. 1. For illustrative purposes, the example shown for the apparatus 100 may be an optical fiber. Embodiments of the apparatus 100 may implement an electrical cable (e.g., HDMI, USB, DisplayPort, etc.).

The apparatus 100 may comprise a cable jacket 110. The cable jacket 110 may be configured to provide protection for the contents of the apparatus 100 (e.g., wires, fibers, etc.). In one example, the cable jacket 110 may be configured to provide electromagnetic shielding. The cable jacket 110 may connect the end 102a to the end 102b of the apparatus 100.

A symbol 112 is shown. The symbol 112 is shown generally in the middle of the cable jacket 110. The symbol 112 may represent an indeterminate length of the cable jacket 110. While the symbol 112 may appear as a discontinuity in the cable jacket 110, the cable jacket 110 may be continuous. In an example where the symbol 112 represents a relatively short length of cable, the apparatus 100 may be a short-run cable (e.g., less than 10 meters). In another example where the symbol 112 represents a relatively long length of cable, the apparatus 100 may be a long-run cable (e.g., 300 meters). The length of the apparatus 100 may be varied according to the design criteria of a particular implementation.

The cable jacket 110 may comprise passive interconnections and/or active interconnections. The cable jacket 110 may comprise wires and/or fibers. In one example, the cable jacket 110 may contain copper wiring. In another example, the cable jacket 110 may contain plastic fibers. In yet another example, the cable jacket 110 may contain glass fibers. The type of material used to communicate using the apparatus 100 may be varied according to the design criteria of a particular implementation.

The end 102a of the apparatus 100 may comprise a fan-out kit 120a. The fan-out kit 120a may be connected to the cable jacket 110. Input/output connectors 122a-122n are shown. Input/output cable jackets 124a-124n are shown extending from the fan-out kit 120a. The I/O cable jackets 124a-124n may be connected to (terminated at) the I/O connectors 122a-122n. In the example shown, the I/O connectors 122a-122n may be an LC connector format. In another example, the I/O connectors 122a-122n may be an FC connector format. In yet another example, the I/O connectors 122a-122n may be an SC connector format. In yet another example, the I/O connectors 122a-122n may be an ST connector format. In still another example, the I/O connectors 122a-122n may be an MPO format. The format of the I/O connectors 122a-122n may be varied according to the design criteria of a particular implementation.

The I/O connectors 122a-122n and the I/O cable jackets 124a-124n may communicate data to/from the fan-out kit 120a. The fan-out kit 120a may be configured to separate wires/fibers carried by the cable jacket 110 to distinct inputs/outputs as the I/O connectors 122a-122n and the I/O cable jackets 124a-124n. In the example shown, the fan-out kit 120a may implement a 2-to-1 fan-out kit (e.g., two cables at one end and one cable on the other end of the fan-out kit 120a). The fan-out kit 120a may be configured to separate out any number of data connections. The number of I/O connectors 122a-122n and/or I/O cable jackets 124a-124n connected to the fan-out kit 120a may be varied according to the design criteria of a particular implementation.

The end 102b of the apparatus 100 may have a similar implementation as the end 102a. The end 102b of the apparatus 100 may comprise a fan-out kit 120b. The fan-out kit 120b may be connected to the cable jacket 110. Input/output connectors 132a-132n are shown. Input/output cable jackets 134a-134n are shown extending from the fan-out kit 120b. The I/O cable jackets 134a-134n may be connected to (terminated at) the I/O connectors 132a-132n. In the example shown, the I/O connectors 132a-132n may be an LC connector format. Similar to the I/O connectors 122a-122n, the I/O connectors 132a-132n may implement various connector formats (e.g., FC SC, ST, MPO, etc.). The format of the I/O connectors 122a-122n and the I/O connectors 132a-132n may be the same or different.

The I/O connectors 132a-132n and the I/O cable jackets 134a-134n may communicate data to/from the fan-out kit 120b. The fan-out kit 120b may be configured to separate wires/fibers carried by the cable jacket 110 to distinct inputs/outputs as the I/O connectors 132a-132n and the I/O cable jackets 134a-134n. In the example shown, the fan-out kit 120b may implement a 2-to-1 fan-out kit (e.g., two cables at one end and one cable on the other end of the fan-out kit 120b). The fan-out kit 120b may be configured to separate out any number of data connections. The number of I/O connectors 132a-132n and/or I/O cable jackets 134a-134n connected to the fan-out kit 120b may be varied according to the design criteria of a particular implementation.

The fan-out kits 120a-120b may be connected at each end 102a-102b of the cable jacket 110. In the example shown, the number of I/O connectors 122a-122n and I/O cable jackets 124a-124n implemented by the fan-out kit 120a may match the number of I/O connectors 132a-132n and I/O cable jackets 134a-134n implemented by the fan-out kit 120b. In some embodiments, the number of I/O connectors 122a-122n and I/O cable jackets 124a-124n implemented by the fan-out kit 120a may not necessarily match the number of I/O connectors 132a-132n and I/O cable jackets 134a-134n implemented by the fan-out kit 120b (e.g., an 8xLC connector at one end and a 1xMPO (ribbon cable) at another end). The I/O connectors 122a-122n and the I/O connectors 132a-132n may connect to the telecommunication hardware 54a-54d shown in association with FIG. 1. For the example shown in association with FIG. 1, the connectors 122a-122n at the end 102a of the cable 100 may connect to the telecommunications hardware 54d in the server cabinet 52a and the connectors 132a-132n at the end 102b of the cable 100 may connect to the telecommunications hardware 54b in the server cabinet 52c.

The fan-out kit 120a may comprise a ferrule 150a with a removably attached cap 152a. The fan-out kit 120b may comprise a ferrule 150b with a removably attached cap 152b. The cap 152a may be attached to fit over (e.g., partially cover) the ferrule 150a. Similarly, the cap 152b may be attached to fit over (e.g., partially cover) the ferrule 150b. In the example shown, the cap 152a is shown removed from the ferrule 150a (e.g., separate pieces with an end of the ferrule 150a fully exposed) and the cap 152b is shown attached to the ferrule 150b (e.g., two pieces connected together with an end of the ferrule 150b covered by the cap 152b).

The ferrules 150a-150b may be connected to a tracing fiber that runs through the cable jacket 110 between the fan-out kits 120a-120b. In an example, the fan-out kit 120a may provide connections to any number of the I/O cable jackets 124a-124n and comprise the single combination of the ferrule 150a and the cap 152a. Similarly, the fan-out kit 120b may provide connections to any number of the I/O cable jackets 134a-134n and comprise the single combination of the ferrule 150b and the cap 152b. Each of the fan-out kits 120a-120b may comprise a single ferrule (e.g., the ferrules 150a-150b, respectively) regardless of the number of the number of data connections implemented by the fan-out kits 120a-120b.

The ferrules 150a-150b may be configured to receive and/or emit light. The combination of the ferrules 150a-150b and the respective caps 152a-152b may be configured to enable tracing of the apparatus 100 using a light input. One of the caps 152a-152b may be removed from the respective ferrules 150a-150b to enable light to be input into the exposed one of the ferrules 150a-150b, while the other one of the caps 152a-152b may be attached to the other of the respective ferrules 150a-150b to disperse the light as output (e.g., to make the light easier to see for the technician). In the example shown, the cap 152a may be removed from the ferrule 150a and light may be input at the cable end 102a using the ferrule 150a and the light may be output at the cable end 102b using the ferrule 150b with the cap 152b attached to aid in light dispersion. In another example, the cap 152b may be removed from the ferrule 150b and light may be input at the cable end 102b using the ferrule 150b and the light may be output at the cable end 102a using the ferrule 150a with the cap 152a attached to aid in light dispersion. The light input may propagate between the ferrules 150a-150b regardless of the length of the cable jacket 110. The emission of the light out of one of the ferrules 150a-150b may enable a person (e.g., a technician) to locate the opposite one of the ends 102a-102b of the apparatus 100 when shining the light into one of the ferrules 150a-150b.

Generally, the caps 152a-152b may be attached to the ferrules 150a-150b. For example, when the apparatus 100 is not being traced (e.g., the apparatus 100 is connected and transmitting data or the apparatus 100 is not connected and kept in storage or packaging), both of the caps 152a-152b may be attached to the respective one of the ferrules 150a-150b. Keeping the caps 152a-152b attached to the ferrules 150a-150b may help prevent loss (or misplacement) of the caps 152a-152b and/or protect the ferrules 150a-150b. When the apparatus 100 is being traced, one of the caps 152a-152b may be removed from the respective one of the ferrules 150a-150b. One of the caps 152a-152b may be removed to expose the respective one of the ferrules 150a-150b to enable light to be input to the exposed one of the ferrules 150a-150b. The other one of the caps 152a-152b at the other end of the cable may remain attached to the respective one of the ferrules 150a-150b. When the other one of the ferrules 150a-150b (e.g., at the opposite end of the apparatus 100) receives the light output, the respective one of the caps 152a-152b attached may disperse the light to create omnidirectional light output (e.g., make the light easier to see).

The caps 152a-152b may be configured to fit over the ferrules 150a-150b. The caps 152a-152b may slide onto the ferrules 150a-150b. In an example, the caps 152a-152b may provide a generally loose fit over the ferrules 150a-150b. The caps 152a-152b may be configured to implement a slip fit (e.g., a friction fit) with the ferrules 150a-150b. The loose fit of the caps 152a-152b may enable a person to easily slide the caps 152a-152b off of or onto the ferrules 150a-150b without using any tools. The caps 152a-152b may be attached to or removed from the ferrules 150a-150b without twisting, snapping or locking together. In some embodiments, the caps 152a-152b may comprise a tether that enables the caps 152a-152b to slip off the ferrules 150a-150b to expose the ferrules 150a-150b but still enable the caps 152a-152b to remain attached to the ferrules 150a-150b (e.g., to prevent removing the caps 152a-152b entirely and then misplacing the caps 152a-152b). The method of attaching or removing the caps 152a-152b may be varied according to the design criteria of a particular implementation.

Figure 3:
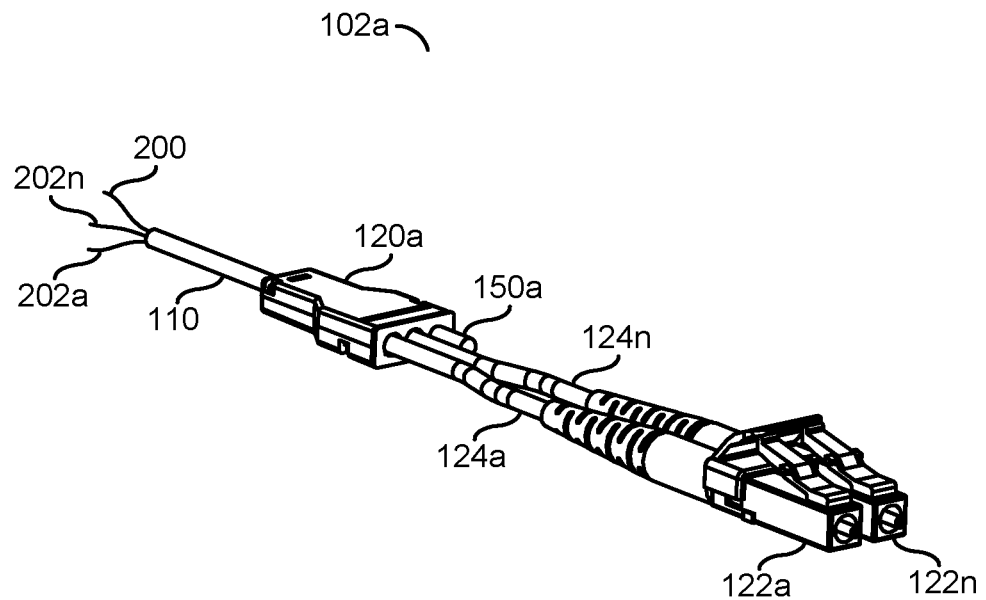
FIG. 3 is a diagram illustrating wires/fibers of an example embodiment of the present invention.

Referring to FIG. 3, a diagram illustrating wires/fibers of an example embodiment of the present invention is shown. A view of the end 102a of the apparatus 100 is shown. The end 102a may comprise the fan-out kit 120a, the I/O connectors 122a-122n, the I/O cable jackets 124a-124n and/or the ferrule 150a. In the example shown, the cap 152a is not shown attached to the ferrule 150a. For example, the end 102a shown may be used as the input side for tracing the apparatus 100 (e.g., to find the opposite end 102b) and the ferrule 150a may have the cap 152a removed in order to receive the light input. The cable jacket 110 is shown extending from the fan-out kit 120a opposite from the I/O cable jackets 124a-124n and the ferrule 150a.

In the example shown, a cutaway view of the cable jacket 110 is shown. The cutaway view may show transmission lines implemented within the cable jacket 110. The cable jacket 110 may comprise a transmission line 200 and/or transmission lines 202a-202n (e.g., data carrying lines). The transmission line 200 may comprise a tracing line (e.g., a tracing fiber). The transmission lines 202a-202n may comprise data lines (e.g., data fibers or wires). When the apparatus 100 is connected, the tracing fiber 202 and the data lines 202a-202n may be contained within the cable jacket. In the example shown, two data lines 202a-202n may be implemented. The number of data lines 202a-202n implemented may be varied according to the design criteria of a particular implementation.

The tracing fiber 200 and the data lines 202a-202n may run through the cable jacket 110 between the fan-out kits 120a-120b. The tracing fiber 200 may be connected to the ferrule 150a. The data lines 202a-202n may be connected to a respective one of the I/O cable jackets 124a-124n and may be terminated at a respective one of the I/O connectors 122a-122n.

In some embodiments, the data lines 202a-202n may comprise copper wires. For example, the cable jacket 110 may implement an Ethernet cable. The data lines 202a-202n may comprise twisted pairs of copper wires to transmit data. The tracing fiber 200 may implement an optical fiber. In some embodiments, the tracing fiber and the data lines 202a-202n may comprise optical fibers. In another example, the cable jacket 110 may implement an HDMI cable, a USB cable, a DisplayPort cable, etc. The type of communication medium used for the data lines 202a-202n and/or the communications protocol used by the data lines 202a-202n may be varied according to the design criteria of a particular implementation.

The fan-out kit 120a may be configured to separate the tracing fiber 200 and the data lines 202a-202n and/or bundle the tracing fiber 200 and the data lines 202a-202n. At the end of the fan-out kit 120a connected to the cable jacket 110, the fan-out kit 120a may bundle the tracing fiber 200 and the data lines 202a-202n to fit within the cable jacket 110. Within the fan-out kit 120a, the bundle of transmission lines received from the cable jacket 110 may be separated to the appropriate output port (e.g., the tracing fiber 200 to the ferrule 150a, the data line 202a to the I/O cable jacket 124a, the data line 202n to the I/O cable jacket 124n, etc.).

Figure 4:
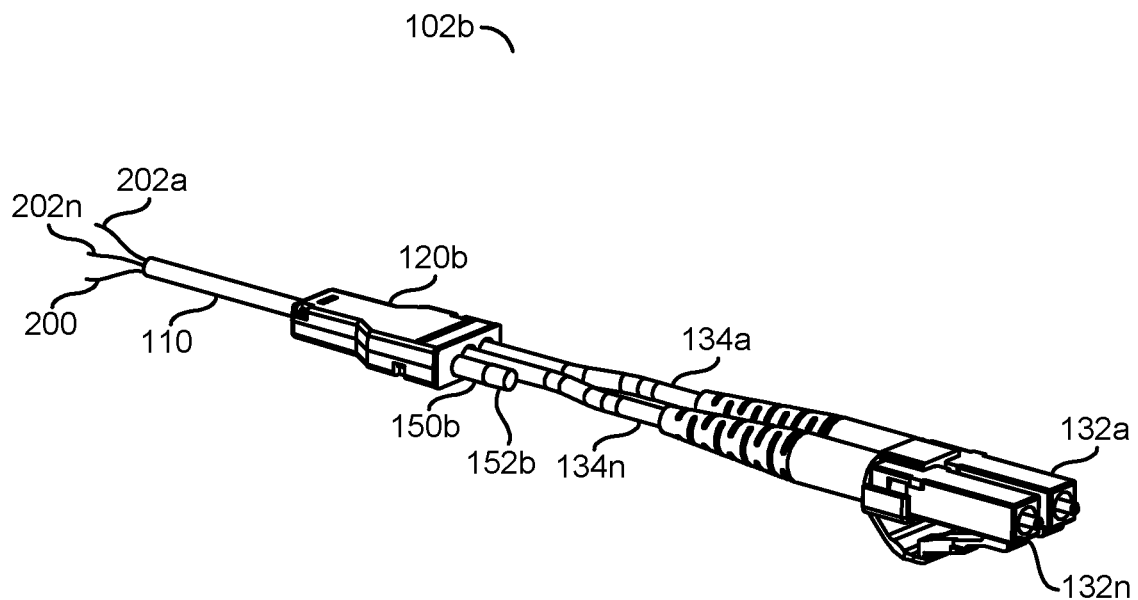
FIG. 4 is a diagram illustrating a view of a ferrule with a cap connected to a fan-out kit.

Referring to FIG. 4, a diagram illustrating a view of a ferrule with a cap connected to a fan-out kit is shown. A view of the end 102b of the apparatus 100 is shown. The end 102b may comprise the fan-out kit 120b, the I/O connectors 132a-132n, the I/O cable jackets 134a-134n, the ferrule 150b and/or the cap 152b. In the example shown, the cap 152b is shown attached to the ferrule 150b. For example, the end 102b shown may be used as the output side for tracing the apparatus 100 (e.g., light may be input to the end 102a in order to trace the apparatus 100 and find the opposite end 102b) and the ferrule 150b may have the cap 152b attached in order to disperse the light output. The cable jacket 110 is shown extending from the fan-out kit 120b opposite from the I/O cable jackets 134a-134n and the combination of the ferrule 150b and the cap 152b.

In the example shown, a cutaway view of the cable jacket 110 is shown. The cutaway view may show transmission lines implemented within the cable jacket 110. Similar to the cutaway view shown in association with FIG. 3, the cable jacket 110 may comprise the tracing fiber 200 and/or the data lines 202a-202n. For example, the end 102a shown in association with FIG. 3 may comprise one end of the tracing fiber 200 and/or the data lines 202a-202n, and the end 102b shown in association with FIG. 4 may comprise the other end of the same tracing fiber 200 and/or the data lines 202a-202n.

The tracing fiber 200 and the data lines 202a-202n may run through the cable jacket 110 between the fan-out kits 120a-120b. The tracing fiber 200 may be connected to the ferrule 150b. The data lines 202a-202n may be connected to a respective one of the I/O cable jackets 134a-134n and may be terminated at a respective one of the I/O connectors 132a-132n.

The fan-out kit 120b may be configured to separate the tracing fiber 200 and the data lines 202a-202n and/or bundle the tracing fiber 200 and the data lines 202a-202n. At the end of the fan-out kit 120b connected to the cable jacket 110, the fan-out kit 120b may bundle the tracing fiber 200 and the data lines 202a-202n to fit within the cable jacket 110. Within the fan-out kit 120b, the bundle of transmission lines received from the cable jacket 110 may be separated to the appropriate output port (e.g., the tracing fiber 200 to the ferrule 150b, the data line 202a to the I/O cable jacket 134a, the data line 202n to the I/O cable jacket 134n, etc.).

The data lines 202a-202n may be configured to carry communications data to/from the I/O connectors 122a-122n and the I/O connectors 132a-132n. The tracing fiber 200 may be configured to propagate a light input to/from the ferrule 150a and the ferrule 150b. In one example, data received by the I/O connectors 122a-122n may be transmitted to the I/O connectors 132a-132n by the data lines 202a-202n within the cable jacket 110. In a similar example, data received by the I/O connectors 132a-132n may be transmitted to the I/O connectors 122a-122n by the data lines 202a-202n within the cable jacket 110. In another example, light input received by the ferrule 150a (e.g., with the cap 152a removed) may be propagated through the tracing fiber 200 within the cable jacket 110 and may be enabled to be emitted by the combination of the ferrule 150b and the cap 152b. In a similar example, light input received by the ferrule 150b (with the cap 152b removed) may be propagated through the tracing fiber 200 within the cable jacket 110 and may be enabled to be emitted by the combination of the ferrule 150a and the cap 152a.

The tracing fiber 200 may be configured to transfer light between the ferrules 150a-150b regardless of whether the data lines 202a-202n are transmitting data. For example, the combination of the ferrules 150a-150b, the caps 152a-152b and the tracing fiber 200 may be operational even when the I/O connectors 122a-122n and/or the I/O connectors 132a-132n are unplugged. The combination of the ferrules 150a-150b, the caps 152a-152b and the tracing fiber 200 may enable the tracing of a cable to be performed without unplugging the I/O connectors 122a-122n and/or the I/O connectors 132a-132n (e.g., from the telecommunications hardware 54a-54d shown in association with FIG. 1).

Figure 5:
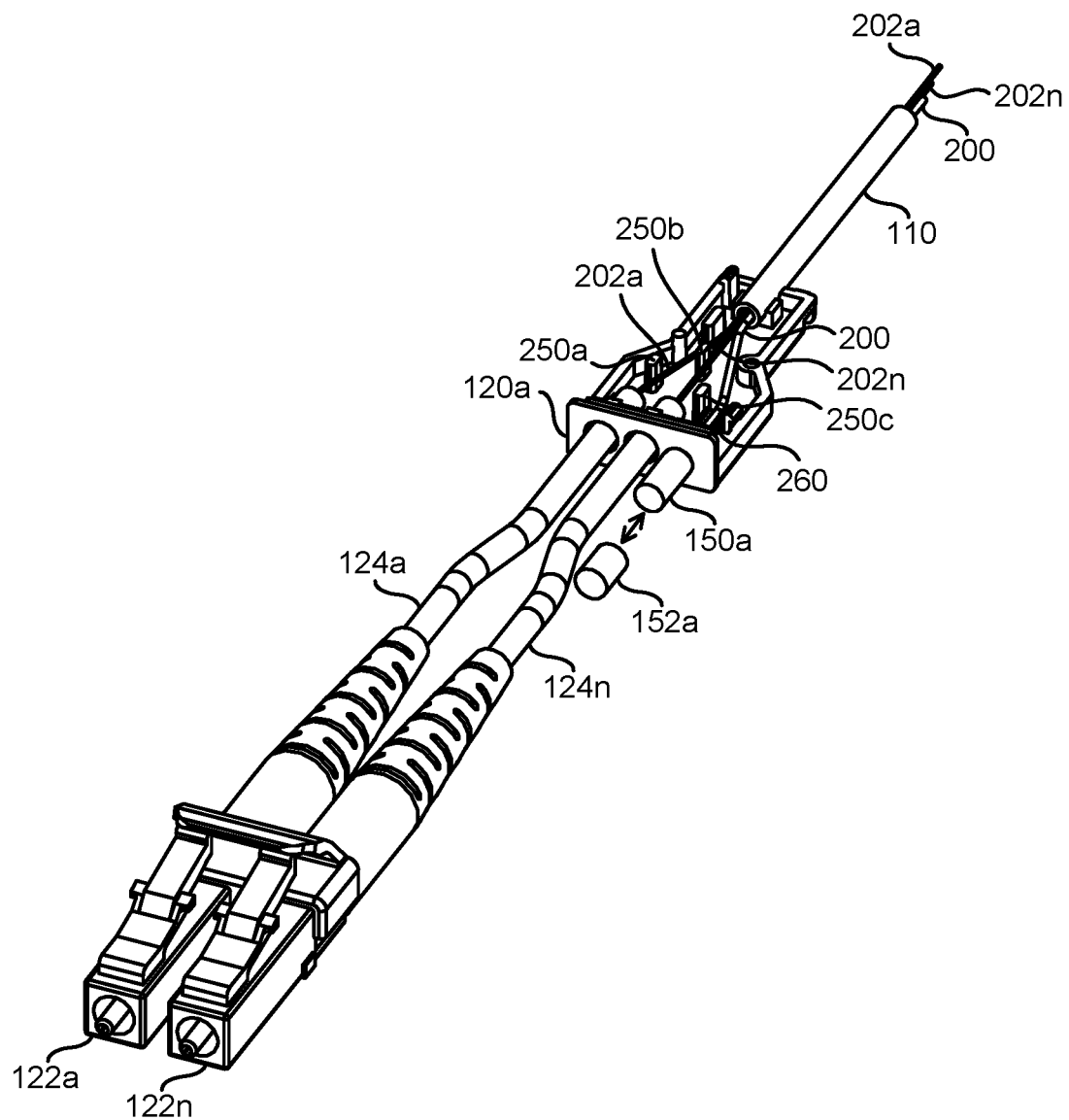
FIG. 5 is a diagram illustrating an internal view of a fan-out kit.

Referring to FIG. 5, a diagram illustrating an internal view of a fan-out kit is shown. The fan-out kit 120a is shown as a representative example. An internal view of the fan-out kit 120b (not shown) may be similar to the fan-out kit 120a shown. The fan-out kit 120a is shown connected to the cable jacket 110. The tracing fiber 200 and the data lines 202a-202n are shown within the cable jacket 110. The I/O connectors 122a-122n and the I/O cable jackets 124a-124n are shown connected to the fan-out kit 120a. The ferrule 150a is shown connected to the fan-out kit 150. The cap 152a is shown removed from the corresponding ferrule 150a. The cap 152a may be removably attached to the ferrule 150a. In the example shown, the fan-out kit 120a may be a 2-to-1 fan-out kit (e.g., the cable jacket 110 may be separated out to two of the I/O connectors 122a-122n and the I/O cable jackets 124a-124n). However, a fan-out kit connected to more (or less) than two of the I/O connectors 122a-122n and the I/O cable jackets 124a-124n may be implemented.

The tracing fiber 200 and the data lines 202a-202n are shown separated within the fan-out kit 120a. For example, the tracing fiber 200 and the data lines 202a-202n may extend beyond the cable jacket 110 at the fan-out kit 120a. The fan-out kit 120a may be configured to route the tracing fiber 200 into the ferrule 150a. The fan-out kit 120a may be configured to route the data lines 202a-202n (e.g., provide a path) to the respective I/O cable jackets 124a-124n.

The fan-out kit 120a may comprise strain relief features 250a-250c. The strain relief features 250a-250c are shown near the tracing fiber 200 and the data lines 202a-202n. The strain relief features 250a-250c may be molded to a housing of the fan-out kit 120a. In an example, the housing of the fan-out kit 120a may be a plastic material. The strain relief features 250a-250c may comprise the same material (e.g., plastic) as the housing of the fan-out kit 120a. In some embodiments, a fabric may be wrapped around the strain relief features 250a-250c. In one example, the strain relief features 250a-250c may be wrapped in a kevlar fabric. The kevlar fabric wrapped around the strain relief features 250a-

250c may be configured to prevent excessive stress and/or limit an amount of stress applied onto fibers (e.g., the tracing fiber 200 and the data lines 202a-202n) during cable stretch (or bending).

The fan-out kit 120a may comprise a guide 260. The guide 260 may provide a chamfer that may lead the tracing fiber 200 into the ferrule 150a. A front end of the ferrule 150a may be exposed to the exterior of the fan-out kit 120a. The rest of the ferrule 150a may be mounted within the housing of the fan-out kit 120a. The tracing fiber 200 may be glued into the ferrule 150a to enable light to be directed to the tracing fiber 200. In an example, the tracing fiber 200 may be glued to the ferrule 150a (and similarly the ferrule 150b on the other end 102b of the apparatus 100). The guide 260 may enable the tracing fiber 200 to enter a through hole for the tracing fiber 200 to be glued to the ferrule 150a. Inserting the tracing fiber 200 into the ferrule 150a may provide mechanical protection for the tracing fiber 200 and/or align the tracing fiber 200 to an external light source. For example, the ferrules 150a-150b may be implemented to help a field technician to ensure that the light (e.g., from a fault locator device) is aimed at (e.g., aligned with) the tracing fiber 200.

The ferrule 150a is shown extending from the fan-out kit 120a. The ferrule 150a may comprise a protrusion. For example, the protrusion of the ferrule 150a may be a nipple and/or a nub. The protrusion of the ferrule 150a from the fan-out kit 120a may enable the ferrule 150a to fit into a device (e.g., a fault locator). The protrusion of the ferrule 150a may facilitate shining an external light into the tracing fiber 200 at the ferrule 150a (e.g., with the cap 152a removed) without first disconnecting the I/O connectors 122a-122n. The ferrule 150b of the fan-out kit 120b may have a similar protrusion implementation.

If light is shone onto the ferrule 150a at one end (e.g., the end 102a) of the cable assembly 100, the light may transmit directly into the tracing fiber 200. The light may propagate through the tracing fiber 200. The light may be emitted by the tracing fiber 200 and out of the ferrule 150b mounted at the other end (e.g., the end 102b) of the cable assembly 100. The cap 152b may be attached to the ferrule 150b to enable the light to be dispersed on the output side (e.g., to help visually locate the end 102b). The tracing feature enabled by the combination of the ferrules 150a-150b, the caps 152a-152b and the tracing fiber 200 may reduce an amount of time taken by technicians when locating both ends of the cable assembly 100.

Referring to FIG. 6, a diagram illustrating light input to a tracing fiber using a ferrule and light refracted by a cap at an output of a tracing fiber is shown. A view of a portion of the apparatus 100 is shown. The ferrule 150a and the ferrule 150b are shown at each end of the apparatus 100. The cap 152a is shown removed from the ferrule 150a. The cap 152b is shown attached to the ferrule 150b. The tracing fiber 200 is shown connected between the ferrules 150a-150b. For clarity, the fan-out kits 120a, the I/O connectors 122a-122n, the I/O cable jackets 124a-124n, the I/O connectors 132a-132n and the I/O cable jackets 134a-134n have been omitted.

An inner surface 300 and an outer surface 302 of the ferrule 150a is shown. Similarly, the inner surface 300 and the outer surface 302 of the ferrule 150b is shown. The tracing fiber 200 may extend from the inner surface 300 of each of the ferrules 150a-150b. The inner surface 300 may be perpendicular to the tracing fiber 200. For example, when the cable 100 is fully extended, the inner surface 300 of the ferrule 150a may face the inner surface 300 of the ferrule 150b. The outer surface 302 may comprise an end surface for the tracing fiber 200. In an example, the tracing fiber 200 may be inserted into the ferrules 150a-150b and may be cut flush with the outer surface 302. The outer surface 302 may be perpendicular to the tracing fiber 200. For example, when the cable 100 is fully extended, the outer surface 302 of the ferrule 150a may face away from the outer surface 302 of the ferrule 150b.

A center line 304 is shown through a center of the ferrules 150a-150b. The line 304 may be a reference line representing a center line (e.g., axis) of the ferrules 150a-150b. A through hole 306 is shown within the ferrule 150a. Similarly, a through hole 306 is shown within the ferrule 150b. The through hole 306 may extend through the ferrules 150a-150b along the center line 304. The through hole 306 may extend through each of the ferrules 150a-150b from the inner surface 300 to the outer surface 302. The through hole 306 may provide an opening in each of the ferrules 150a-150b to enable the tracing fiber 200 to be inserted into and secured (e.g., glued) to the ferrules 150a-150b. An implementation of the guide 260 may be attached to (e.g., molded to) each implementation of the inner surface 300. The guide 260 may be used to aid in inserting the tracing fiber 200 into the through hole 306. In an example, the guide 260 may align the tracing fiber to the through hole 306 on the inner surface 300 and provide strain relief for the tracing fiber 200 when inserted into the through hole 306 of each of the ferrules 150a-150b.

The ferrules 150a-150b are shown implemented having a cylindrical shape. In some embodiments, the ferrules 150a-150b may have a rectangular or square shape. In some embodiments, the ferrules 150a-150b may be implemented having standard industrial sizes (e.g., ⌀1.25 mm, ⌀1.4 mm, ⌀1.8 mm, ⌀2.0 mm, and ⌀2.5 mm, etc.). Generally, the ferrules 150a-150b may be implemented having any size (e.g., the size of the ferrules 150a-150b may be selected from any number of available sizes). In some embodiments, both the ferrules 150a-150b may be implemented having the same size and same shape (e.g., both the ferrules 150a-150b may be cylindrical with a 1.25 mm diameter). In some embodiments, each of the ferrules 150a-150b may have a different size and/or a different shape (e.g., the ferrule 150a may be cylindrical with a 1.25 mm diameter and the ferrule 150b may be a rectangular shape with a size of 3 mm×2 mm, the ferrule 150a may be cylindrical with a 1.25 mm diameter and the ferrule 150b may be cylindrical with a 2.5 mm diameter, the ferrules 150a-150b may both be rectangular with a 3 mm×2 mm size). Similarly, the caps 152a-152b may have a size and shape that matches the corresponding one of the ferrules 150a-150b to enable the caps 152a-152b to be removably attached to the ferrules 150a-150b. The size and/or shape of either of the ferrules 150a-150b may be varied according to the design criteria of a particular implementation.

In one example, the ferrules 150a-150b may be implemented using a ceramic material. In another example, the ferrules 150a-150b may be implemented using a metallic material (e.g., stainless steel, beryllium copper, etc.). In yet another example, the ferrules 150a-150b may be implemented using a glass material. In some embodiments, both of the ferrules 150a-150b may be implemented using the same material (e.g., both ceramic). In another example, each of the ferrules 150a-150b may be implemented using a different material (e.g., the ferrule 150a may be ceramic and the ferrule 150b may be glass). The type of material used to implement the ferrules 150a-150b may be varied according to the design criteria of a particular implementation.

The caps 152a-152b may be configured to fit over the outer surface 302 of the respective ferrules 150a-150b. For example, when the caps 152a-152b are attached to the ferrules 150a-150b, the outer surface 302 may be covered. The caps 152a-152b may be sized and shaped similar to the ferrules 150a-150b. For example, the caps 152a-152b may be slightly larger than the ferrules 150a-150b in order to provide the slip fit over the ferrules 150a-150b. In one example, the caps 152a-152b may be implemented comprising a polycarbonate material (PC). In another example, the caps 152a-152b may be implemented comprising a silicone material. In yet another example, the caps 152a-152b may be implemented comprising a poly(methyl methacrylate) material (PMMA). In still another example, the caps 152a-152b may be implemented comprising materials such as polystyrene (PS), cyclo olefin polymer (COP), etc. Generally, the caps 152a-152b may be implemented using various optical grade plastic materials. The size, shape and/or material of the caps 152a-152b may be varied according to the design criteria of a particular implementation.

A portion of the tracing fiber 200 is shown within the ferrule 150a. Similarly, a portion of the tracing fiber 200 is shown within the ferrule 150b. The portion of each end of the tracing fiber 200 may be sitting within and glued along the axis 304 of the ferrules 150a-150b in the through hole 306. The portion of each end of the tracing fiber 200 may be configured to be inserted into the inner surface 300 and extend along the through hole 306 towards the outer surface 302 (e.g., the protruding end extending out of the fan out kits 120a-120b). For example, the portion of the tracing fiber may be flush or almost flush with the outer surface 302 of the ferrules 150a-150b.

Lines L1, L2 and L3 are shown directed into the tracing fiber 200. The lines L1-L3 may represent a light input. The cap 152a may be removed to enable the light to be directed into the tracing fiber 200 (e.g., located within the through hole 306). The light L1-L3 may be shone onto the ferrule 150a. In an example with the tracing fiber 200 flush with the outer surface 302 of the ferrule 150a, the incoming light L1-L3 may shine directly into the tracing fiber 200. In an example with the tracing fiber not perfectly flush with the outer surface 302 (e.g., the tracing fiber 200 does not extend completely through the through hole 306 to reach the outer surface 302), the incoming light L1-L3 may shine into the through hole 306 of the ferrule 150a and may be collected by the portion of the tracing fiber 200 within the through hole 306 of the ferrule 150a.

The light input L1-L3 that enters into the tracing fiber 200 may propagate through the tracing fiber 200. A line LP is shown alongside the tracing fiber 200. The line LP may represent the direction of propagation of the light input L1-L3. The tracing fiber 200 may be configured to propagate the light input L1-L3 from the end 102a to the end 102b of the apparatus 100. The tracing fiber 200 may present the light input L1-L3 to the ferrule 150b (e.g., into the through hole 306). A line LO is shown in the ferrule 150b. The line LO may represent the output light received from the tracing fiber 200 in response to the light input L1-L3. The ferrule 150b may receive the light input L1-L3 resulting from the propagation LP through the tracing fiber 200 as the output light LO. The cap 152b may be attached to the ferrule 150b (e.g., over the outer surface 302, which may be the output end of the apparatus 100).

The caps 152a-152b may comprise a reflective portion 310. The reflective portion 310 may comprise multiple reflective surfaces (e.g., an internal reflection surface). The multiple reflective surfaces of the reflective portion 310 may be implemented at a head of the caps 152a-152b. The reflective portion 310 may be configured to reflect some of the output light LO received after the light propagates through the tracing fiber 200. The reflection caused by the reflective portion 310 may be configured to scatter the light as output. By scattering the light using the reflective portion 310, the output light may provide omnidirectional illumination. Omnidirectional illumination may help a technician spot the ends 102a-102b of the apparatus 100.

Lines 320a-320b are shown extending from the ferrule 150b. The lines 320a-320b may represent the light emitted by the ferrule 150b. The emitted light 320a-320b may be output from the ferrule 150b in response to receiving the light input L1-L3 propagated through the tracing fiber 200 in the direction LP as the output light LO. In the example shown, the cap 152b may be attached to the ferrule 150b (e.g., over the outer surface 302) to enable the reflective portion 310 of the cap 152b to reflect the output light LO to provide the scattered emitted light 320a-320b as output (e.g., enable omnidirectional output of the output light 320a-320b at the ferrule 150b).

The input light L1-L3 may be received by the tracing fiber 200 at the outer surface 302 of the ferrule 150a. The input light L1-L3 may propagate through the tracing fiber 200 in the direction LP towards the ferrule 150b. The output light LO propagating through the tracing fiber 200 may reach the portion of the tracing fiber 200 within the through hole 306 of the ferrule 150b and continue through the tracing fiber 200 until the tracing fiber 200 ends at the outer surface 302 of the ferrule 150b. The reflective portion 310 of the cap 152b attached to the end of the ferrule 150b may reflect the output light LO in the omnidirectional pattern of the emitted light 320a-320b as output from the apparatus 100. In the example shown, the light input L1-L3 may be provided into the tracing fiber 200 at the ferrule 150a and output as the emitted light 320a-320b via the scattering of the light output LO by the cap 152b attached to the outer surface 302 of the ferrule 150b. Similarly, the light input L1-L3 may be provided to the tracing fiber 200 at the ferrule 150b (e.g., with the cap 152b removed) and propagate through the tracing fiber 200 towards the ferrule 150a and the cap 152a attached to outer surface 302 of the ferrule 150a may scatter the light output LO.

Referring to FIG. 7, a diagram illustrating light transmission through a ferrule when a data transmission failure is present is shown. A view of a portion of the apparatus 100 is shown. The view of a portion of the apparatus 100 may be similar to the example shown in association with FIG. 6. The ferrule 150a with the cap 152a removed and the ferrule 150b with the cap 152b attached are shown at each end of the apparatus 100. The reference center line 304 is shown. The tracing fiber 200 is shown inserted into the through hole 306 between the inner surface 300 and the outer surface 302 and connected between the ferrules 150a-150b. The light input L1-L3 is shown being directed into the tracing fiber 200 at the ferrule 150a. The emitted light 320a-320b is shown output from the ferrule 150b after being reflected by the reflective portion 310 of the cap 152b.

An example of a data line 202a-202a' (e.g., comprising a data line portion 202a and a data line portion 202a') is shown along with the tracing fiber 200. The data line 202a-202a' may be a representative example of any of the data lines 202a-202n within the cable jacket 110. The data line 202a-202a' is shown running parallel to the tracing fiber 200. The data line 202a-202a' may be separate from the tracing fiber 200.

A discontinuity 350 is shown in the data line 202a-202a'. In one example, the discontinuity 350 may be a physical break in the data line 202a-202a' (e.g., the fiber may have been cut). In another example, the discontinuity 350 may represent a loss of communication of the data transmitted by the data line 202a-202a' and/or a decrease in performance of the data line 202a-202a' (e.g., the data line 202a-202a' may be dropping packets and/or communicating at a lower throughput than specified). In yet another example, the break 350 may represent an error in the telecommunications hardware 54a-54d (e.g., a hardware failure that prevents the communication of the data, one of the I/O connectors 122a-122n and/or the I/O connectors 132a-132n are disconnected, etc.). The type of fault that prevents data transmission may be varied according to a particular operating scenario.

A signal (e.g., LIGHT) is shown communicated by the tracing fiber 200. The signal LIGHT may represent the propagation of the light L1-L3 through the tracing fiber 200. The signal LIGHT may be transmitted from the ferrule 150a to the ferrule 150b by the tracing fiber 200. The signal LIGHT may be emitted from the ferrule 150b as the scattered light 320a-320b after the reflection caused by the reflective portion 310.

A signal (e.g., DATA) is shown communicated by the data line 202a. The signal DATA may represent data communications transmitted by the data lines 202a-202n. In the example shown, the signal DATA may be transmitted through the data line 202a up until reaching the break 350. The break 350 may prevent the signal DATA from continuing through the data line portion 202a'. For example, the signal DATA intended to be sent from the end 102a of the apparatus 100 may not reach the end 102b.

The signal DATA may communicate computer readable data. The signal LIGHT may not communicate computer readable data. For example, the signal LIGHT may be viewed by a person. The combination of the ferrules 150a-150b, the respective caps 152a-152b, and the tracing fiber 200 communicating the signal LIGHT may operate independent from the data lines 202a-202n, the I/O connectors 122a-122n and the I/O connectors 132a-132n communicating the signal DATA.

Even if one of the data lines 202a-202n has the break 350, the signal LIGHT may still propagate through the tracing fiber 200. For example, even if one or more of the data lines 202a-202n carrying data physically breaks, as long as the tracing fiber 200 is not cut, the light signal LIGHT may still propagate from one end 102a to the other end 102b of the apparatus 100. The tracing fiber 200 may be a physically separate fiber from any of the data lines 202a-202n.

While the example shown provides an example scenario with the break 350, tracing the apparatus 100 using the light input L1-L3 may be performed even while the data lines 202a-202n are communicating the data. For example, the light input may be presented to, and propagated by the tracing fiber 200 without interrupting the communication of the signal DATA. For example, the light input L1-L3 may be presented to the tracing fiber 200 within the ferrule 150a while the I/O connectors 122a-122n are plugged into one of the telecommunication hardware modules 54a-54d and while the I/O connectors 132a-132n are connected to one of the telecommunication hardware modules 54a-54d. For example, the combination of the ferrules 150a-150b and the caps 152a-152b may be accessible and operational without unplugging either end 102a-102b of the apparatus 100.

Figure 8:
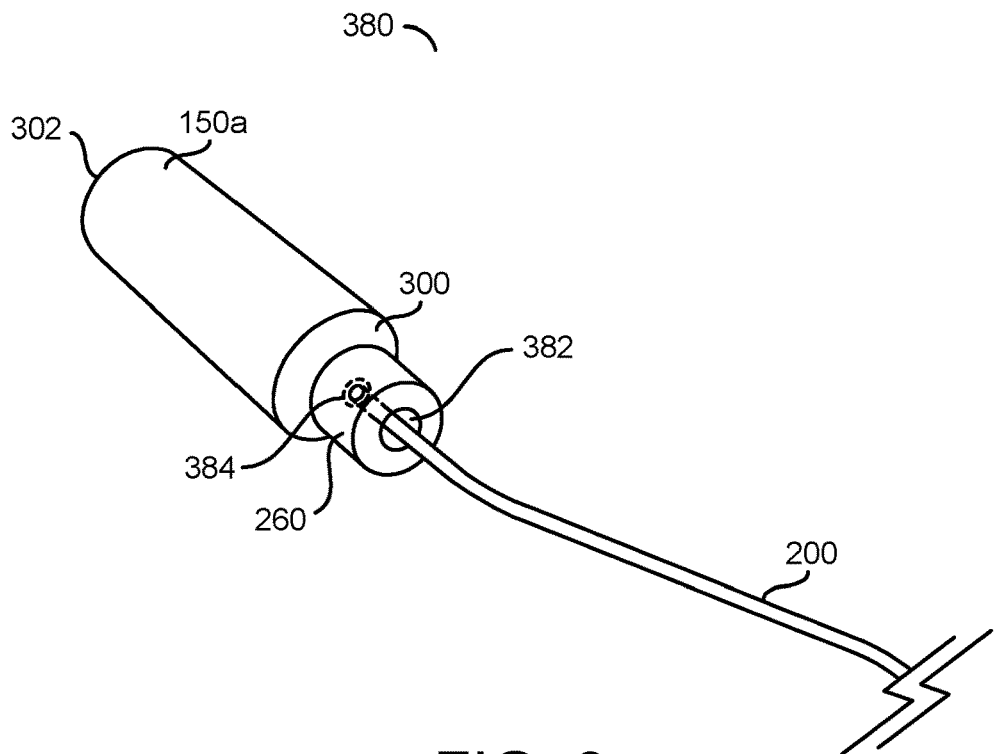
FIG. 8 is a diagram illustrating a tracing fiber inserted into a through hole.

Referring to FIG. 8, a diagram illustrating a tracing fiber inserted into a through hole is shown. A view 380 of the end 102a is shown. The view 380 may comprise the ferrule 150a connected to the tracing fiber 200. For illustrative purposes, the cap 152a is not shown. The view 380 may illustrate how the tracing fiber 200 may be attached to the ferrule 150a. While the view 380 provides an example of the ferrule 150a, the end 102b with the ferrule 150b may have a similar implementation.

The ferrule 150a is shown having a smooth, cylindrical shape. The ferrule 150a may comprise the outer surface 302 at one end (e.g., the end protruding from the fan-out kit 120a) and the inner surface 300 at another end (e.g., a back end). The light input may enter the tracing fiber 200 located within the through hole 306 (not shown) at an opening on the outer surface 302 (e.g., the tracing fiber 200 may be inserted all the way along the through hole 306 until flush with the outer surface 302). The inner surface 300 may be a location where a portion of the tracing fiber 200 may be inserted into the through hole 306 of the ferrule 150a.

A guide 260 for a through hole is shown at the inner surface 300. The guide 260 may comprise an opening 382. The tracing fiber 200 may be inserted into the opening 382. A through hole opening 384 is shown. The through hole opening 384 may be an opening at the inner surface 300 that is aligned with the axis 304 of the ferrule 150a. The through hole opening 384 may be an opening at the inner surface 300 for the through hole 306.

The back end of the ferrule 150a may implement the through hole opening 384. The through hole opening 384 may comprise an opening configured to enable the tracing fiber 200 to fit within the through hole 306. In one example, the tracing fiber 200 may be inserted into the through hole opening 384 and attached with glue with the through hole 306. The through hole 306 may extend through the ferrule 150a to the outer surface 302. The through hole 306 may enable a portion of the tracing fiber 200 to be inserted within the ferrule 150a to enable the tracing fiber 200 to reach near the outer surface 302. Extending the tracing fiber 200 near (or flush with) the outer surface 302 may enable the tracing fiber 200 to receive the light input L1-L3 and/or output the output light LO.

Figure 9:
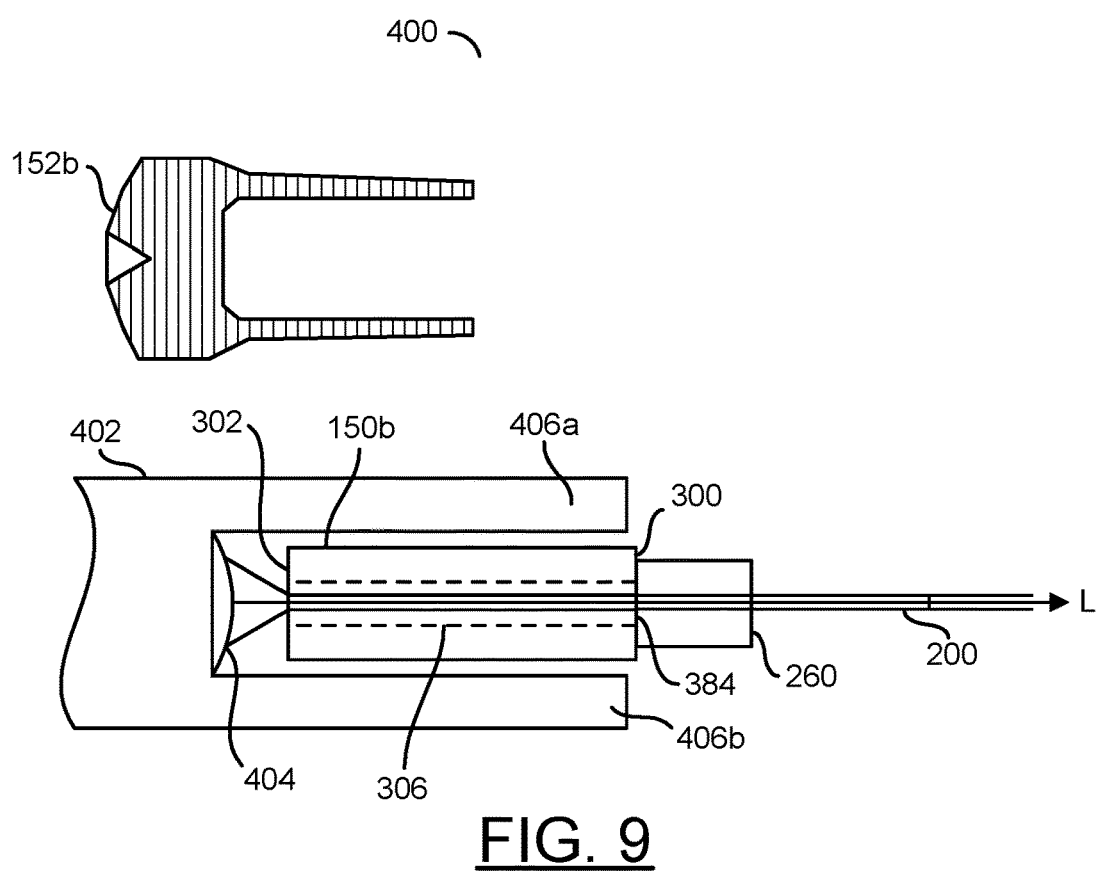
FIG. 9 is a diagram illustrating a fault locator device attached to a ferrule and presenting a light input to the tracing fiber.

Referring to FIG. 9, a diagram illustrating fault locator device attached to a ferrule and presenting a light input to the tracing fiber is shown. A side view 400 of the end 102b of the apparatus 100 is shown. The side view 400 of the end 102b may comprise the ferrule 150b receiving a light input with the cap 152a removed (and implies that the ferrule 150a with the cap 152a attached may emit the light at the other end of the apparatus 100). While the ferrule 150b is shown as a representative example, the description of the ferrule 150b may be similarly applicable to the ferrule 150a when receiving the light input.

The side view 400 may comprise the ferrule 150b. The ferrule 150b may be implemented with a cylindrical shape or a rectangular shape (or another shape). The through hole 306 is shown between the inner surface 300 and the outer surface 302 of the ferrule 150b. The tracing fiber 200 is shown inserted into the guide 260, through the through hole opening 384 at the inner surface 300 and into the through hole 306. The tracing fiber 200 may be glued into the through hole 306. In an example, the guide 260 may be molded to the inner surface 300 to provide an indication of where the through hole opening 384 is located.

A device 402 is shown attached to the ferrule 150b. The device 402 may be attached over the outer surface 302 of the ferrule 150b. The device 402 may implement a fault locator. The fault locator 402 may comprise a light source 404 and/or a sleeve 406a-406b. The light source 404 may implement a light emitting diode (LED). The light source 404 may be configured to generate a light input (e.g., the signal L) for the apparatus 100. In the example shown, the light source 404 may generate the signal L. The signal L may be aimed at the outer surface 302 of the ferrule 150b to enable the signal L to be input directly into the tracing fiber 200 within the through hole 306. The light signal L may be received by the tracing fiber 200 and transmitted along the tracing fiber 200. The tracing fiber 200 may propagate the light signal L to the other end (e.g., 102a) of the apparatus 100.

The sleeve 406a-406b may be configured to fit over the ferrule 150b (e.g., over the outer surface 302). The view 400 may provide a cross-sectional view of the fault locator 402. In the example shown, a portion 406a of the sleeve 406a-406b is shown above the ferrule 150b and a portion 406b of the sleeve 406a-406b is shown below the ferrule 150b. However, the sleeve 406a-406b may surround the ferrule 150b (e.g., above, below and around the sides) to enable the ferrule 150b to fit into the fault locator 402. The cap 152b may be removed from the ferrule 150b to enable the sleeve 406a-406b of the fault locator 402 to fit onto the outer surface 302 of the ferrule 150b. For example, a technician may use the fault locator 402 to shine the light from the light source 404 into the tracing fiber that is secured within the through hole 306 of the ferrule 150b so that the light will be emitted at the other end 102a of the apparatus 100 by the tracing fiber secured within the through hole 306 of the ferrule 150a (e.g., with the cap 152a attached to provide omnidirectional light output).

The ferrules 150a-150b may be configured to fit into the fault locator 402. The shape of the protrusion of the ferrules 150a-150b from the fan-out kits 120a-120b may enable the ferrules 150a-150b to fit within the sleeve 406a-406b of the fault locator 402. Generally, the fault locator 402 may be an off-the-shelf device. The light L generated by the light source 404 may be shone onto the outer surface 302 of the ferrule 150b to enable the tracing fiber 200 to receive the light. The fault locator 402 may fit onto either one of the ferrules 150a-150b (e.g., when the respective caps 152a-152b are removed) without needing to disconnect the apparatus 100 (e.g., the I/O connectors 122a-122n and/or the I/O connectors 132a-132n may remain connected to the telecommunications hardware 54a-54d).

The fault locator 402 may be configured to fit loosely over the ferrules 150a-150b. Generally, the fault locator 402 may not be securely attached to the ferrules 150a-150b. In an example, two technicians may be in the field (e.g., the data center 50). One technician may remove the cap 152a and slide the fault locator 402 over the ferrule 150a and hold the fault locator 402 in place. The other technician may trace down the other end 102b of the cable 100 by searching for the light being emitted from the ferrule 150b. In some embodiments, only one technician may be in the field. To enable the fault locator 402 to remain secured to the ferrule 150a while the technician walks away to search for the light emitted from the ferrule 150b, a short adapter jumper cable may be implemented. The short adapter jumper cable may be inserted into the fault locator 402 and the other end of the short adapter jumper cable may be attached to the ferrule 150a so that the light emitted by the fault locator 402 is provided to the tracing cable 200 even while the technician walks away.

Figure 10:
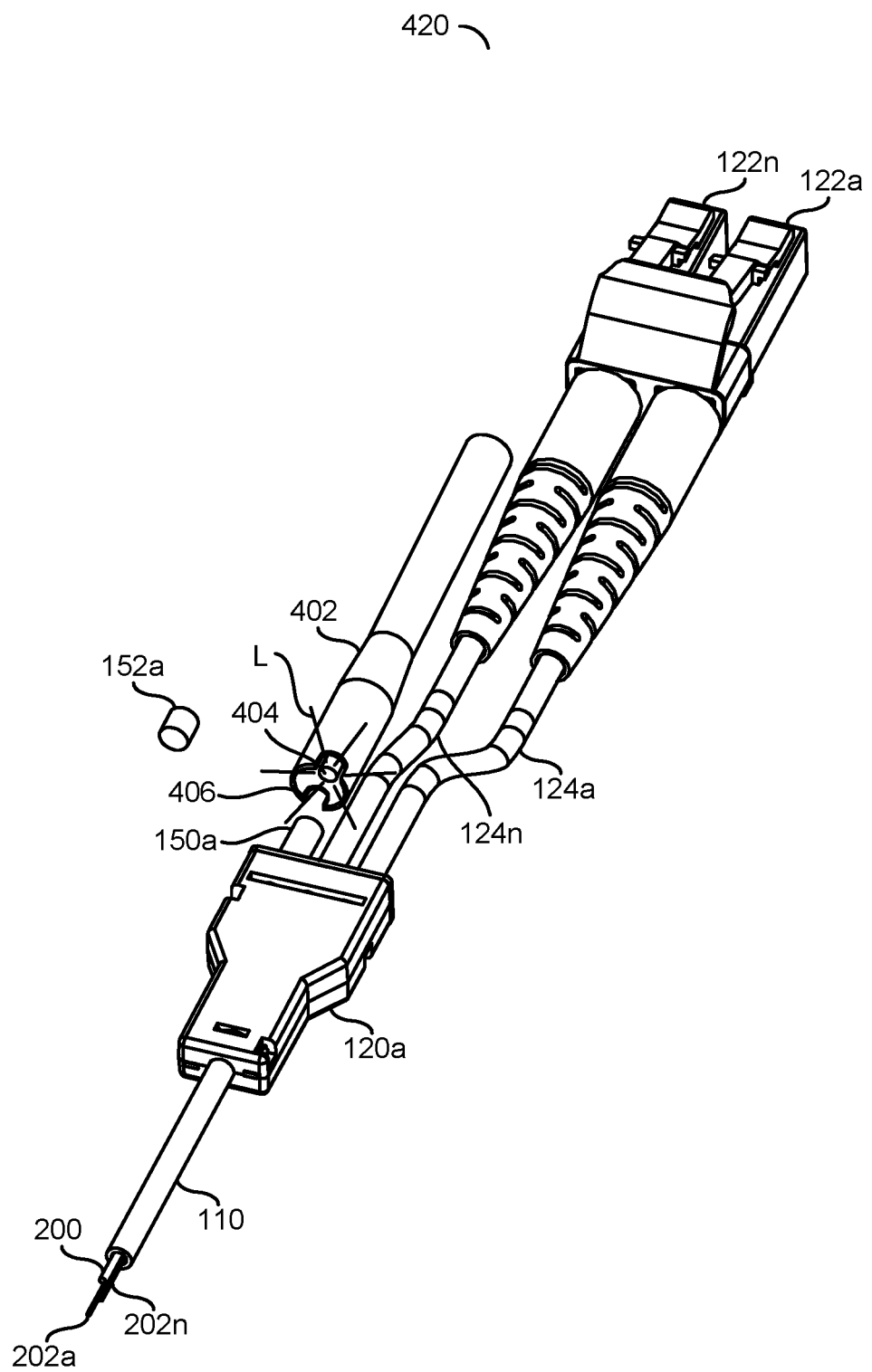
FIG. 10 is a diagram illustrating a fault locator presenting a light input to a ferrule.

Referring to FIG. 10, a diagram illustrating a fault locator presenting a light input to a ferrule is shown. A view 420 is shown. The view 420 may illustrate a view of the end 102a of the apparatus 100. The end 102a is shown as a representative example and the description of the end 102a may be similarly applicable to the end 102b of the apparatus 100.

The cable jacket 110, the fan-out kit 120a and the fault locator 402 are shown in the view 420. The tracing fiber 200, and the data lines 202a-202n are shown within the cable jacket 110. The I/O cable jackets 124a-124n and the ferrule 150a are shown connected to the fan-out kit 120a. The I/O cable jackets 124a-124n may be terminated at the I/O connectors 122a-122n. The fan-out kit 120a shown may be a 2-to-1 fan-out kit. The cap 152a is shown removed from the ferrule 150a to enable the ferrule 150a to be the input side for the light L.

The light source 404 of the fault locator 402 may be configured to emit the light L. The protrusion of the ferrule 150a may be configured to fit within the fault locator 402. For example, the ferrules 150a-150b may be designed to be small enough to fit within the sleeve 406a-406b of the fault locator 402. The ferrules 150a-150b may protrude a distance long enough to reach the light source 404 within the sleeve 406a-406b of the fault locator 402. The fault locator 402 may be a common tool carried by technicians (e.g., part of an IT technician toolbox).

In the example view 420, the I/O connectors 122a-122n are not shown connected (e.g., not inserted) into one of the hardware modules 54a-54d. The ferrules 150a-150b, the respective caps 152a-152b and the tracing fiber 200 may be used to trace the apparatus 100 regardless of whether the I/O connectors 122a-122n are connected and/or regardless of whether the data lines 202a-202n are transmitting data. In one example, a technician may shine the light L into tracing fiber 200 within the ferrule 150a when the cap 152a is removed to verify cable installation (e.g., ensure that the data cables are plugged into the correct ports of the telecommunications hardware 54a-54d). The ferrules 150a-150b, the caps 152a-152b and the tracing fiber 200 may be used during installation (e.g., while connecting the I/O connectors 122a-122n and the I/O connectors 132a-132n) or after installation (e.g., after the I/O connectors 122a-122n and the I/O connectors 132a-132n have already been connected). In the example shown, the fault locator 402 may be shorter than the length of the I/O cable jackets 124a-124n. With the fault locator 402 shorter than the I/O cable jackets 124a-124n, the fault locator 402 may be easily used while the I/O connectors 122a-122n are plugged into the telecommunications hardware 54a-54d.

In the example shown from the perspective of the view 420, the ferrule 150a may be implemented on a left side of the end of the fan-out kit 120a (e.g., to the left of the I/O cable jackets 124a-124n). In some embodiments, the ferrule 150a may be implemented on a right side of the end of the fan-out kit 120a (e.g., to the right of the I/O cable jackets 124a-124n). In some embodiments, the ferrule 150a may be implemented between the I/O cable jackets 124a-124n. In some embodiments, the ferrule 150a may be implemented on another surface of the fan-out kit 120a. The location of the ferrules 150a-150b on the fan-out kits 120a-120b may be varied according to the design criteria of a particular implementation.

Figure 11:
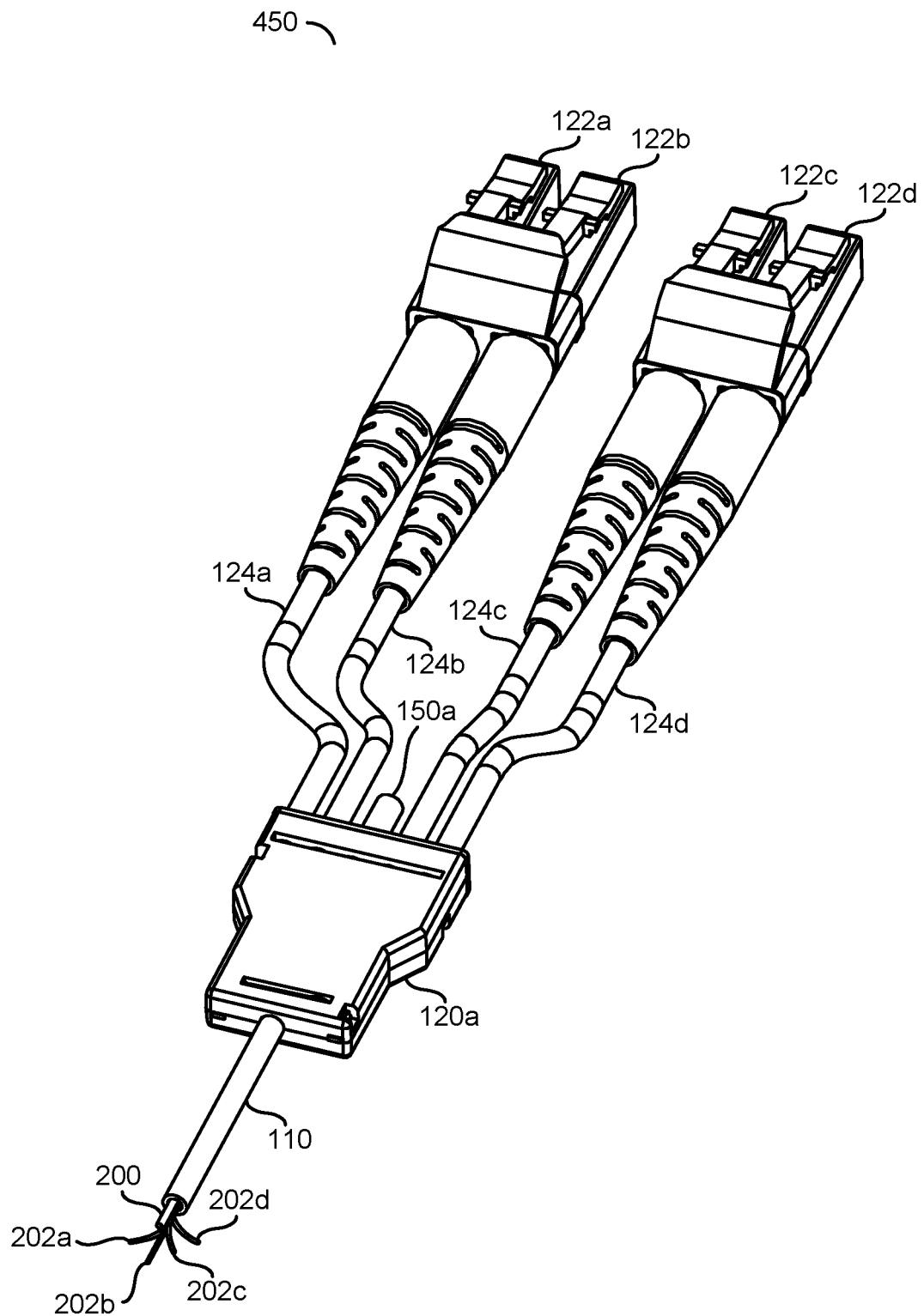
FIG. 11 is a diagram illustrating a fan-out kit with four connectors.

Referring to FIG. 11, a diagram illustrating a fan-out kit with four connectors is shown. A view 450 is shown. The view 450 may illustrate a view of the end 102a of the apparatus 100. The end 102a is shown as a representative example, and the description of the end 102a may be similarly applicable to the end 102b of the apparatus 100.

The cable jacket 110 and the fan-out kit 120a are shown in the view 450. The tracing fiber 200, and the data lines 202a-202d are shown within the cable jacket 110. The I/O cable jackets 124a-124d and the ferrule 150a are shown connected to the fan-out kit 120a. The I/O cable jackets 124a-124d may be terminated at the I/O connectors 122a-122d.

In the example shown, the cable jacket 110 may comprise four of the data lines 202a-202d. The data lines 202a-202d may be bundled with the tracing fiber 200 within the cable jacket 110. The fan-out kit 120a may be configured to separate and route the tracing fiber 200 and the data lines 202a-202d. Within the fan-out kit 120a, the tracing fiber 200 may be routed into the ferrule 150a. Within the fan-out kit 120a, the data line 202a may be routed to the I/O cable jacket 124a, the data line 202b may be routed to the I/O cable jacket 124b, the data line 202c may be routed to the I/O cable jacket 124c and the data line 202d may be routed to the I/O cable jacket 124d. In the example shown, the fan-out kit 120a may implement a 4-to-1 fan-out kit.

The ferrule 150a is shown in the middle of the front surface of the fan-out kit 120a. In the example shown, the ferrule 150a may be in between the I/O cable jackets 124a-124b and the I/O cable jackets 124c-124d. In some embodiments, the ferrule 150a may be implemented in between the I/O cable jacket 124a and the I/O cable jacket 124b. In some embodiments, the ferrule 150a may be implemented between the I/O cable jacket 124c and the I/O cable jacket 124d.

Figure 12:
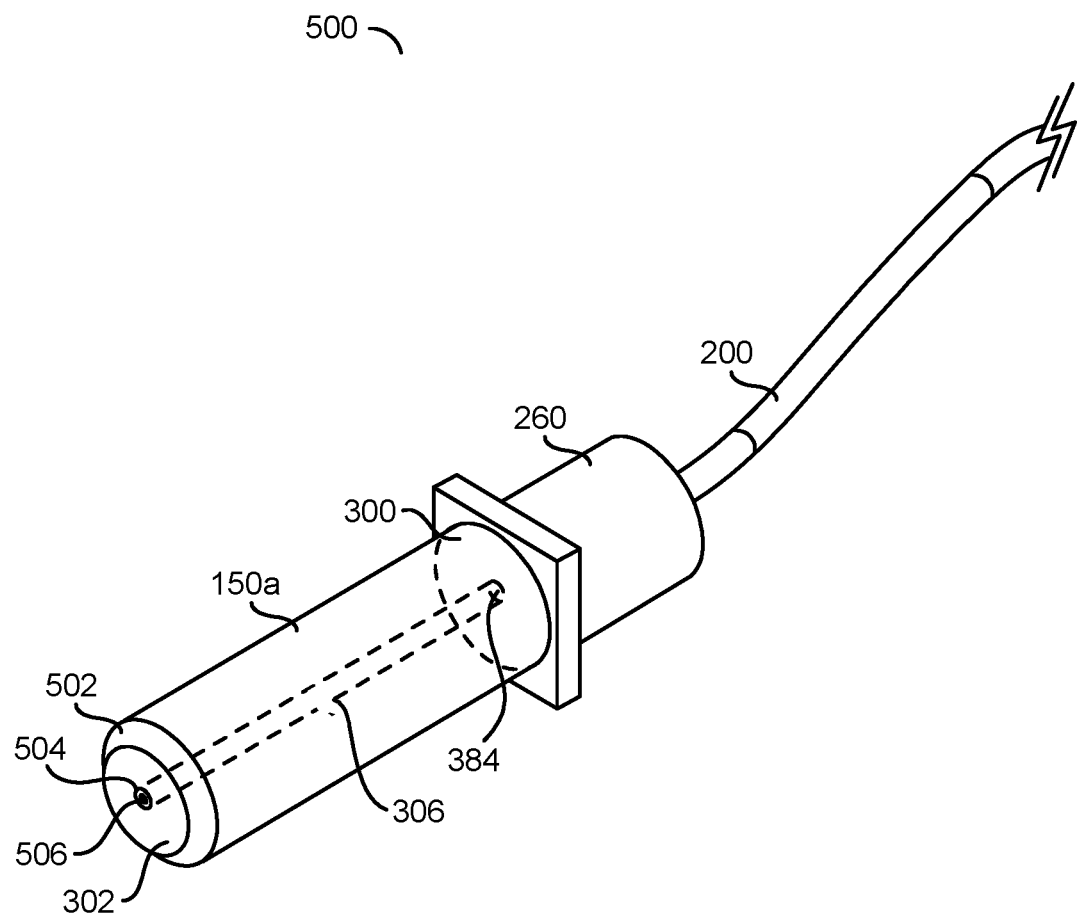
FIG. 12 is a diagram illustrating a tracing fiber at an end surface of a ferrule.

Referring to FIG. 12, a diagram illustrating a tracing fiber at an end surface of a ferrule is shown. A view 500 of the ferrule 150a is shown. The ferrule 150a is shown with the cap 152a removed. The view 500 may illustrate how the tracing fiber 200 may be attached to the ferrule 150a. While the view 500 provides an example of the ferrule 150a, the end 102b with the ferrule 150b may have a similar implementation.

The outer surface 302 of the ferrule 150a is shown. The guide 260 is shown attached to the inner surface 300 of the ferrule 150a. The tracing fiber 200 is shown extending from the inner surface 300 and the guide 260. The through hole 306 is shown within the ferrule 150a and between the inner surface 300 and the outer surface 302.

The outer surface 302 may comprise a generally flat surface. The outer surface 302 may be a fiber end surface for the tracing fiber 200. The outer surface 302 is shown with an edge 502. In the example shown, the edge 502 may comprise an angled chamfer transition. In another example, the edge 502 may comprise a rounded transition. The edge 502 may be configured to provide a smooth transition to enable the cap 152a to slide on or off the ferrule 150a easily. The shape of the edge 502 may be varied according to the design criteria of a particular implementation.

An opening 504 is shown on the outer surface 302. The opening 504 may comprise a front through hole opening. The through hole 306 may extend through the ferrule 150a with one through hole opening 384 on the inner surface 300 and the front through hole opening 504 on the outer surface 302. The tracing fiber 200 may be inserted into the through hole 306 via the through hole opening 384 on the inner surface 300. The tracing fiber 200 may be fed into the through hole 306 until reaching the front through hole opening 504. A tracing fiber end 506 is shown at the through hole opening 504.

The through hole 306 may be a small hole (e.g., an inner diameter of 125 μm) that runs along the axis of the ferrules 150a-150b. The through hole 306 may enable the tracing fiber 200 to pass through the ferrules 150a-150b. The tracing fiber 200 may be secured within through hole 306 of the ferrules 150a-150b by glue. Any portion of the tracing fiber 200 that extends beyond the front through hole opening 504 on the outer surface 302 may be trimmed and then polished so that tracing fiber 200 may be flush to the outer surface 302 of the ferrules 150a-150b. In the example shown, the tracing fiber end 506 may be the polished end of the tracing fiber 200 that may be flush with the outer surface 302 of the ferrule 150a.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
a first ferrule comprising a cap and protrude directly from a first fan-out kit;
a second ferrule comprising said cap and protrude directly from a second fan-out kit; and
a tracing fiber configured to propagate light from said first ferrule to said second ferrule, wherein
(i) said first ferrule enables said light to be directed into said tracing fiber when said cap is removed,
(ii) said cap of said second ferrule is configured to scatter said light to provide an omnidirectional emission of said light from said second ferrule,
(iii) said tracing fiber is bundled with one or more data carrying lines in a cable,
(iv) each of said data carrying lines are configured to enable a communication of data,
(v) said tracing fiber is configured to propagate said light without interrupting said communication of data,
(vi) said first ferrule is within said first fan-out kit and a front end of said first ferrule is exposed exterior to said first fan-out kit and said second ferrule is within said second fan-out kit and a front end of said second ferrule is exposed exterior to said second fan-out kit, and
(vii) said tracing fiber and said data carrying lines extend beyond said cable to (a) enter said first fan-out kit and said second fan-out kit and (b) be exposed without a cable jacket within said first fan-out kit and said second fan-out kit.

2. The apparatus according to claim 1, wherein said first ferrule and said second ferrule are implemented having a ceramic material.

3. The apparatus according to claim 1, wherein said first ferrule and said second ferrule each have a diameter selected from one of a plurality of sizes.

4. The apparatus according to claim 1, wherein said first ferrule and said second ferrule each have a cylindrical shape.

5. The apparatus according to claim 1, wherein said cap removably attached to said first ferrule and said cap removably attached to said second ferrule are each configured to scatter said light.

6. The apparatus according to claim 1, wherein (i) said cap of said first ferrule is removed to enable a fault locator device to fit over said first ferrule and (ii) said fault locator device is configured to generate said light.

7. The apparatus according to claim 1, wherein said tracing fiber is connected between said first fan-out kit and said second fan-out kit.

8. The apparatus according to claim 7, wherein (i) said first fan-out kit and said second fan-out kit are each configured to route said data carrying lines to individual input/output cable jackets terminated with connectors and (ii) said first ferrule, said second ferrule and said tracing fiber operate independently of said individual input/output cable jackets terminated with connectors and said data carrying lines.

9. The apparatus according to claim 1, wherein emitting said light from said second ferrule provides an indication of a location of an end of said cable.

10. The apparatus according to claim 1, wherein said cap comprises an internal reflection surface at a head of said cap configured to create omnidirectional illumination of said light.

11. The apparatus according to claim 1, wherein said tracing fiber is glued into said first ferrule and said second ferrule to provide (i) mechanical protection and (ii) alignment with an external light source.

12. The apparatus according to claim 11, wherein said tracing fiber is (i) glued within a through hole that extends along an axis from an inner surface to an outer surface of each of said first ferrule and said second ferrule and (ii) flush with said outer surface of said first ferrule and said outer surface of said second ferrule.

13. The apparatus according to claim 1, wherein said first ferrule and said second ferrule each have a rectangular shape.

14. The apparatus according to claim 1, wherein said first ferrule and said second ferrule are implemented having at least one of a glass material and a metallic material.

15. An apparatus comprising:
a cable jacket comprising (a) one or more data carrying lines configured to transmit data and (b) a tracing fiber;
a first fan-out kit (A) connected to a first end of said cable jacket, (B) comprising (i) a plurality of first cable jackets with connectors each (a) connected to one end of one of said data carrying lines and (b) configured to connect to a first communication port and (ii) a first ferrule (a) protruding directly from said first fan-out kit and (b) comprising a cap and (C) configured to route said first end of said tracing fiber into said first ferrule; and
a second fan-out kit (A) connected to a second end of said cable jacket, (B) comprising (i) a plurality of second cable jackets with connectors each (a) connected to another end of said data carrying lines and (b) configured to a second communication port and (ii) a second ferrule (a) protruding directly from said second fan-out kit, (b) comprising said cap and (C) configured to route said second end of said tracing fiber into said second ferrule, wherein
(i) said tracing fiber within said first ferrule is configured to receive a light input,
(ii) said tracing fiber is configured to propagate said light input to said second ferrule,
(iii) said second ferrule enables said light input to be emitted, and
(iv) said tracing fiber and said data carrying lines extend beyond said cable jacket to enter said first fan-out kit and said second fan-out kit.

16. The apparatus according to claim 15, wherein said first ferrule and said second ferrule enable tracing both ends of said cable jacket using said light input.

17. The apparatus according to claim 16, wherein (i) said apparatus is implemented in a data center comprising a plurality of cables and (ii) tracing both ends of said cable jacket using said light input enables distinguishing said apparatus from said plurality of cables.

18. The apparatus according to claim 15, wherein said tracing fiber comprises a plastic fiber or a glass fiber and said first ferrule and said second ferrule each comprise a ceramic material.

19. The apparatus according to claim 15, wherein said first fan-out kit and said second fan-out kit are each configured to (i) separate said tracing fiber from said data carrying lines to a respective output port of said first fan-out kit and said second fan-out kit and (ii) provide a path for each of said data carrying lines to connect to (a) one of said plurality of first cable jackets with connectors and (b) one of said plurality of second cable jackets with connectors.

20. The apparatus according to claim 19, wherein (i) said first fan-out kit and said second fan-out kit each comprise one or more strain relief features, (ii) said strain relief features are molded into a housing of each of said first fan-out kit and said second fan-out kit and (iii) said strain relief features are configured to (A) limit an amount of stretching of said tracing fiber and said data carrying lines and (B) route and separate each of said data carrying lines that are exposed without a jacket within (a) said first fan-out kit to an individual one of said plurality of first cable jackets with connectors and (b) said second fan-out kit to an individual one of said plurality of second cable jackets with connectors.

* * * * *